Jan. 11, 1955  J. K. MOSHER  2,699,316
VALVE FOR CONTROLLING THE LEVEL OF FLUID IN TANKS
Filed June 27, 1951

INVENTOR.
James K. Mosher
BY
Wilfred E. Lawson
ATTORNEY

United States Patent Office 2,699,316
Patented Jan. 11, 1955

2,699,316

VALVE FOR CONTROLLING THE LEVEL OF FLUID IN TANKS

James K. Mosher, Pasadena, Calif., assignor to Schulz Tool and Manufacturing Co., San Gabriel, Calif., a corporation of California Application June 27, 1951, Serial No. 233,744

3 Claims. (Cl. 251—35)

This invention relates to a valve, and more particularly to a valve for controlling the level of fluid in a tank.

This invention is an improvement over the valve shown and described in my copending application, Serial No. 185,839, filed September 20, 1950, and is a continuation-in-part of that application.

In military aircraft, such as jet-propelled aircraft, large quantities of fuel are consumed in a short period of time, so that such planes must be capable of carrying large quantities of fuel. If a conventional means were used to fill the fuel tanks of such planes, as for example, pumps used in automotive filling stations, several days of continuous pumping action would be required to fill the tanks. In order that such aircraft can be refueled quickly and gotten back into action, the fuel is pumped into the wing tanks at a rate of 600 gallons per minute or better.

The fluid pressure actuated valve shown and described in my copending application, Serial No. 185,839, together with subsequent improvements thereto, prevents the bursting of the wing tanks when the tanks are full and the fluid pressure is still present from the filling source. However, since the flow is virtually non-compressible, the rapid closing of the valves causes a sharp ram and relatively violent reaction due to the sudden impeding of the flow of fuel from the pumping equipment.

It is therefore an object of the present invention to provide a means for insuring that the fluid pressure actuating valve will close rapidly enough to prevent damage to the aircraft and yet slowly enough to overcome the ramming action to the pumping equipment.

Another object of the invention is to provide a valve which includes a plate that is provided with an orifice or opening through which a tapered pin projects, whereby, as the main valve closes, the flow of fluid through the orifice is gradually reduced by the taper of the pin until the flow of fuel is completely stopped when the main valve is in closed position, the gradual closing of the orifice tending to delay the closing of the main valve to thereby overcome the ram action of the fuel.

A further object of the invention is to provide a valve which is extremely simple and inexpensive to manufacture.

Other objects and advantages will be apparent during the course of the following description.

In the accompanying drawings forming a part of this application, and in which like numerals are used to designate like parts throughout the same:

Figure 1:
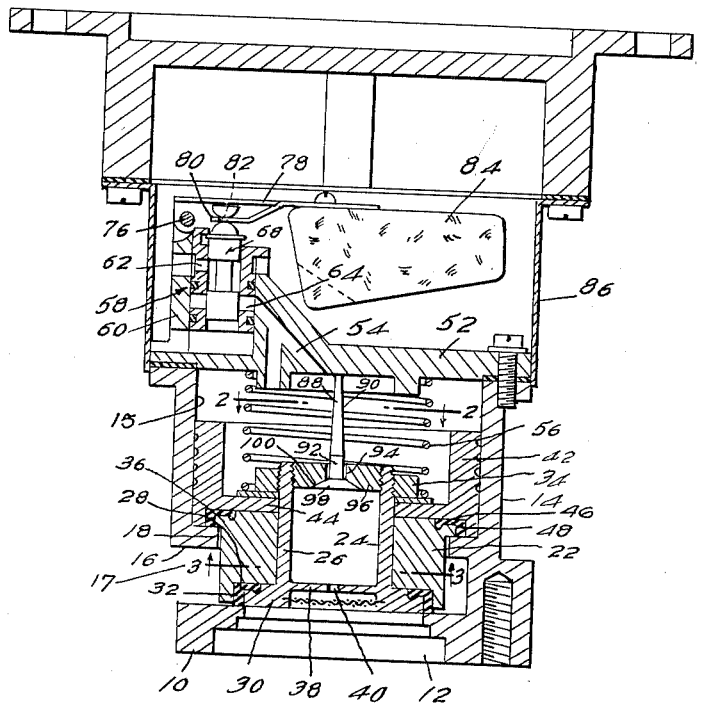
Figure 1 is a longitudinal sectional view taken through the valve of the present invention.
Figure 2:
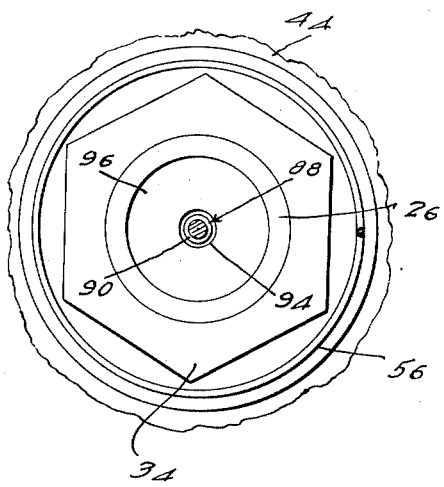
Figure 2 is a sectional view taken on the line 2—2 of Figure 1.
Figure 3:
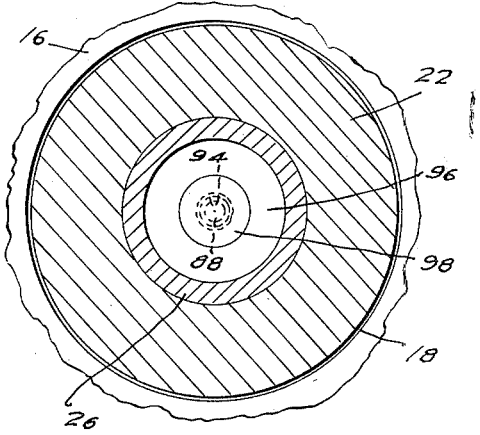
Figure 3 is a sectional view taken on the line 3—3 of Figure 1.

Referring to the drawings, there is shown a valve assembly which includes a seat 10 that has extending therethrough a flow passage 12, there being a valve body or cylinder 14 arranged in alignment with the flow passage 12. The cylinder 14 has an axially extending cylindrical bore 15 which terminates short of the lower end of the cylinder to provide an inturned flange 16 which forms an opening 18 that is arranged in alignment with the flow passage 12. The seat 10 is supported on the cylinder 14 and spaced from the inturned flange 16 to provide a laterally extending flow passageway 17 between the seat and the outer face of the annular flange 16, opening from the flow passage 12. Mounted for movement in the opening 18 is a valve 22 which is provided with an enlarged opening 24 that extends therethrough for receiving a bushing 26. The end of the passage 24 adjacent the valve seat 10 opens into an enlarged annular recess 28, and carried on the end of the bushing 26 adjacent the seat 10 is an annular flange 30 which is received in the recess 28. The annular recess 28 is formed for the reception of an annular band 32 of packing material, the lower edge of which projects slightly beyond the end of the valve 22 to engage the seat 10 when the valve 22 is in closed position.

The end of the bushing 26 remote from the flange 30 projects beyond the end of the valve 22 remote from the seat 10 and is externally screw-threaded for cooperation with a coupling nut 34 by which the piston hereinafter referred to is connected to the valve 22. As shown in the drawings, the valve 22 projects into the cylinder 14 and is provided adjacent one of its ends with an outstanding annular flange 36, while the bushing 26 is provided near its lower end with a head 38 that is formed with a small aperture 40 through which fluid entering the flow passage 12 is conducted into the cylinder 14.

Mounted for sliding movement in the cylinder 14 is a piston 42 which carries at its end adjacent to the seat 10 a head 44. The head 44 is provided with an annular recess 46 for receiving the flange 36 of the valve 22. The wall of the recess 46 is spaced from the periphery of the flange 36 for receiving an annular packing ring 48 which extends slightly beyond the end of the piston 42. Thus, when the valve 22 is in closed position, the packing or seal 48 will form an effective seal against the flange 16, and at the same time metal-to-metal contact between the seat 10, valve 22, flange 16 and piston 42 will be avoided. Likewise, it is to be noted that the opening 18 is of slightly larger diameter than the diameter of the valve 22 in order to avoid metal-to-metal contact and assure freedom of movement of the valve. The diameter of the piston 42 is also such as to freely slide within the cylinder 14.

The end of the cylinder 14 remote from the valve seat 10 is closed by a head 52 which has formed therein a fluid discharge port 54. Thus, fluid will flow through the flow passage 12 and aperture 40 into the cylinder 14, and this fluid may escape through the port 54 without building up pressure within the cylinder. A light coil spring 56 is interposed between the head 52 of the cylinder 14 and the head 44 of the piston 42 for normally urging the valve 22 toward the seat 10 to thereby maintain the flow 12 passage closed so long as any fluid pressure remains in the cylinder 14 behind the piston 42.

In order to regulate the building up of fluid pressure within the cylinder 14, I provide a pilot valve designated generally by the numeral 58. The pilot valve 58 comprises a cylinder 60 which is carried by the head 52 adjacent one side thereof, and the cylinder is provided adjacent one end with a discharge opening 62 and intermediate its ends with an inlet opening 64 which is in communication with the discharge port 54.

Mounted for sliding movement in the cylinder 60 is a slide valve which is designated generally by the numeral 68. When the slide valve 68 is in open position, fluid will be permitted to flow from the port 64 through the port 62, but when the valve closes, flow of fluid through the ports 62 and 64 will be discontinued. Pivotally mounted at 76 adjacent to the cylinder 60 is an arm 78 which carries a fork 80, the fork 80 being received in a groove 82 that is formed in the valve 68 adjacent its upper end. A float 84 is connected to the arm 78 in such a manner that the arm 78 will be moved upwardly about its pivot upon movement of the float to thereby move the valve 68 in the cylinder 60 and close the port 64. When the float 84 moves in the opposite direction, the valve 68 will be moved downwardly in the cylinder 60 so as to cause the port 64 to become uncovered. A cage 86 is preferably carried by the head 52 and surrounds the float 84 and the valve 58. This cage is adapted to be suspended from the top of a conventional fuel tank and openings may be provided in the cage 86 whereby communication will be established with the interior of the fuel tank in order to permit fuel therein to enter the cage 86 and actuate the float 84.

Military aircraft, particularly jet aircraft, use huge quantities of fuel per minute, and therefore the fuel carrying capacity of such aircraft is very large. Conventional means of adding fuel to a fuel tank, such as is now done in filling stations for automobiles, would require several days just to fill these fuel tanks if they were running continuously. In order that such aircraft may be refueled quickly and gotten back into action, the fuel is pumped into the wing tanks at a rate of 600 gallons per minute or better. The fluid pressure actuated valve shown and described in my copending application, Serial No. 185,839, with subsequent improvements thereto, prevents the bursting of the wing tanks when the tanks are full and the fluid pressure is still present from the filling source. However, since the fluid is virtually non-compressible, the rapid closing of the described valve causes a sharp ram and relative violent reaction by the sudden impeding of the flow of the fuel from the pumping equipment. By means of the mechanism of the present invention, the fluid pressure actuating valve will close rapidly enough to prevent damage to the aircraft, yet slowly enough to overcome the ramming action to the pumping equipment.

For accomplishing this, a pin 88 is provided, the pin 88 including a tapered portion 90. The pin 88 further includes a cylindrical portion 92, the pin 88 slidably projecting through an opening or orifice 94 which is arranged in a plate 96. The plate 96 is secured to the upper end of the bushing 26 in any suitable manner. The pin 88 further includes a head 98 that is adapted to seat in a countersunk recess or socket 100 that is arranged in the lower surface of the plate 96. The top of the pin 88 may be secured in any suitable manner to the bottom of the head 52 of the cylinder.

Thus, as the main valve is caused to close, a flow of fluid through the orifice 94 will be proportionately reduced by the taper of the pin 88 until the flow is totally impeded when the main valve is in closed position. This gradual closing of the orifice 94 slowly increases the metering action of the orifice 94 by the pin 88 to sufficiently delay the closing of the main valve, whereby the ram action will be overcome.

In use, fluid enters the flow passage 12 under pressure and this will tend to lift the valve 22 off of the seat 10, but as long as the port 54 in the head 52 remains closed, the fluid passing through the passage 40 will enter the cylinder 14 behind the piston 42. Due to the fact that the area of the piston is greater than the area of the surface of the valve 22 exposed to the fluid, the valve 22 will remain seated on the seat 10 and in closing relation with respect to the flow passage 12. When the fluid level in the fuel tank falls below a predetermined value, the float 84 will move downwardly about its pivot 76 to thereby move the slide valve 68 downwardly and open the port 64 so as to establish a flow of fluid through the port 54 and port 64 out through the valve 58 and into the fuel tank. As soon as the level in the tank attains a predetermined value, the float 84 will move upwardly causing the plunger 68 and the valve 58 to close the port 64 and hence shut off the flow of fluid through the port 64, thus building pressure in the cylinder 14 behind the piston 42. As the pressure builds up in the cylinder, the piston 42 will move downwardly causing the valve 22 to move against the pressure of the fluid in the flow passage 12 until the seals 32 and 48 engage the seat 10 and flange 16, respectively, at which time the passage of fluid through the flow passage 12 will be arrested.

As the fuel in the tank is withdrawn therefrom, it is evident that the float 84 will again fall until such time as the slide valve 68 opens the port 64 in the valve 52 when the cycle will be repeated. In this way positive seating of the valve 32 on its seat 10 is assured as the pressure of the fuel is employed against the piston 42 to seat the valve.

As previously stated, considerable difficulty has been encountered in preventing a sharp ram and relative violent reaction by the sudden impeding of the flow of the fuel from the pumping equipment. The mechanism of the present invention assures that the fluid pressure actuating valve will close rapidly enough to prevent damage to the aircraft, yet slowly enough to overcome the ramming action to the pumping equipment. Thus, the tapered pin 88 which is suspended from head 52 of the cylinder of the pump passes through the orifice 94 at the top of the main valve. Then, as the main valve is caused to close, as previously described, the flow of fluid between the wall of the orifice 94 and the pin 88 is proportionately reduced by the taper of the pin 88 until the flow is totally impeded and the main valve is in a closed position. This gradual closing of the orifice 94 slowly increases the metering action of the orifice 94 which sufficiently delays the closing of the main valve to overcome the ram action.

The pin 88 is provided with a head 98 that is adapted to seat in a countersunk recess or opening 100 that is arranged in the lower surface of the plate 96.

What is claimed is:

1. A fluid pressure actuated valve comprising: a valve body; a cylindrical bore in said body and terminating short of one end of the body to provide an inwardly extending annular flange defining a circular opening in said one end; a valve seat spaced from said one end of the valve body and supported on the body to provide a laterally extending flow passageway between the inner face of said seat and the outer face of said annular flange; a flow passageway through said seat and opening into said laterally extending passageway; a valve element seating against the seat around the flow passageway in the seat; said valve element having piston means slidable in the bore; a head covering the outer end of the bore, said head and valve element defining end walls of a chamber in said bore; conduit means permitting flow of fluid from said chamber; valve means associated with said conduit means for controlling the flow of fluid from the chamber; an opening through said valve element to provide flow communication from the said passageway in the seat to the said chamber; and a tapered pin secured to said head and passing loosely into the said opening through the valve element for decreasing the area of the opening as the valve element moves in a direction toward its seat.

2. A fluid pressure actuated valve comprising: a valve body; a cylindrical bore in said body and terminating short of one end of the body to provide an inwardly extending annular flange defining a circular opening in said one end; a valve seat spaced from said one end of the valve body and supported on the body to provide a laterally extending flow passageway between the inner face of said seat and the outer face of said annular flange; a flow passageway through said seat and opening into said laterally extending passageway; a valve element seating against the seat around the flow passageway in the seat; said valve element having piston means slidable in the bore; a head covering the outer end of the bore, said head and valve element defining end walls of a chamber in said bore; conduit means permitting flow of fluid from said chamber; valve means associated with said conduit means for controlling the flow of fluid from the chamber; an axially extending fluid passageway through said valve element providing for direct flow of fluid from the said passageway through the seat to the said chamber; a plate across the inner end of the said axial passageway in the valve element, said plate being fixed with respect to the valve element; an aperture in said plate; and a tapered pin secured to said head and extending through said aperture.

3. A fluid pressure actuating valve comprising: a valve body; a cylindrical bore in said body and terminating short of one end of the body to provide an inwardly extending annular flange defining a circular opening in said one end; a valve seat spaced from said one end of the valve body and supported on the body to provide a laterally extending flow passageway between the inner face of said seat and the outer face of said annular flange; a flow passageway through said seat and opening into said laterally extending passageway; a valve element seating against the seat around the flow passageway in the seat; said valve element having piston means slidable in the bore; a head covering the outer end of the bore, said head and valve element defining end walls of a chamber in said bore; conduit means permitting flow of fluid from said chamber; valve means associated with said conduit means for controlling the flow of fluid from the chamber; an axially extending fluid passageway through said valve element providing for direct flow of fluid from the said passageway through the seat to the said chamber; a plate across the inner end of the said axial passageway in the valve element, said plate being fixed with respect to the valve element; an aperture in said plate; and a tapered pin extending through said aperture and having its smaller end secured to said head, the larger end of said pin having a cylindrical portion surrounded by the walls of said aperture when the valve element is seated, the cross-sectional area of said cylindrical portion being less than that of said aperture.

(References on following page)

References Cited in the file of this patent

UNITED STATES PATENTS

| | | |
|---|---|---|
| 226,224 | Demarest | Apr. 6, 1880 |
| 548,977 | Foster | Oct. 29, 1895 |
| 1,056,562 | Lombard | Mar. 18, 1913 |
| 2,213,753 | Teahen | Sept. 3, 1940 |
| 2,548,368 | Hartley | Apr. 10, 1951 |
| 2,574,022 | Dahl | Nov. 6, 1951 |

FOREIGN PATENTS

| | | |
|---|---|---|
| 57,292 | Australia | of 1912 |